United States Patent Office 3,322,697
Patented May 30, 1967

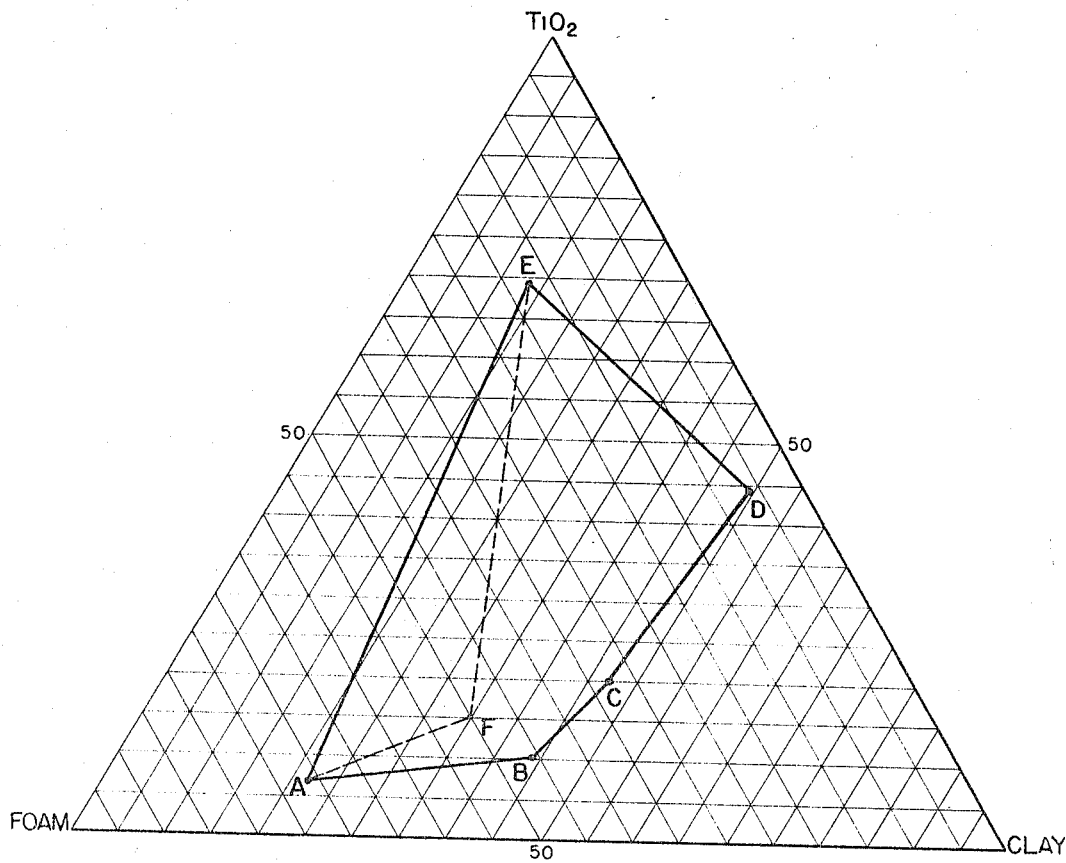

3,322,697
FILLER COMPRISING FIBROUS FOAMED
AMINOPLAST RESIN
Thomas P. Czepiel, Waterville, Maine, assignor to Scott Paper Company, Philadelphia, Pa., a corporation of Pennsylvania
Filed May 1, 1964, Ser. No. 364,136
1 Claim. (Cl. 260—2.5)

This application is a continuation-in-part of Ser. No. 131,990 filed Aug. 17, 1961 and now abandoned.

The present invention relates to a unique combination of angulate fibrous fragments of foamed aminoplast resins, mineral pigments or loading agents useful for inclusion in cellulosic fibrous materials to obtain improved sheeted materials. The invention particularly includes paper, paperboard and pulp stocks composed of cellulosic fibrous materials of the kind normally employed in the manufacture of paper products in admixture with a unique combination of fragments of a partially disintegrated urea-formaldehyde resin foam and pulverulent mineral fragments depicted as an area on the graph in the included figure. The unique combination of fillers gives sheeted materials of improved properties, such as opacity.

Paper, as it is generally known today, is composed of matted or felted cellulosic fibers, such as those obtained from wood, cotton, bagasse and similar vegetable sources. For certain special applications, a portion of the papermaking cellulosic fibers may be replaced by mineral fibers, for example, vitreous fibers, or filaments of synthetic resins generated by a wet-spinning process, including regenerated celluloses, cellulose acetate, polyesteramides, polynitriles, acrylonitriles, polyvinyl acetate-chloride copolymers.

The opacity of paper is generally improved by incorporating therein mineral loading agents which are calcined or dried powders which become attached to the pulp fibers and partially replace the air-filled spaces which normally exist between the fibers. To be suitable for use as loading or filling agents the mineral pigments must meet several requirements. They should possess a high degree of whiteness, a high refractive index, small particle size below 5 microns and preferable in the range of from 0.1 to 0.5 micron, low solubility in water, and low specific gravity. They should also be chemically inert toward other constituents of the papermaking furnish. Furthermore, unless the pigment has very unusual properties, it must be inexpensive.

Frequently used loading agents may be divided into two groups. First are those, such as clay, talc and calcium carbonate, which have low refractive indices and are relatively low in cost. It is usually necessary to add large quantities of these loading agents to obtain a substantial improvement in the opacity of paper. Second are those, such as titanium dioxide and zinc sulfide, which have high refractive indices and are relatively high in cost. Small additions of these loading agents are usually sufficient to obtain substantial improvements in the opacity of paper.

An important economic consideration in the use of loading agents is the percent retention, or fraction of pigment added to the pulp system which is retained in the dry sheet of paper. A high percent retention is desirable from the standpoint of reducing loss of pigment, particularly in the case of expensive pigments such as titanium dioxide and zinc sulfide. It is not enough, however, that the pigment particles be loosely held in the sheet; they must be firmly anchored to the fibers so that they will not dust out during calendering or printing.

The highly refractive pigments such as titanium dioxide and zinc sulfide are extremely efficient opacifying agents in paper when small percentage amounts (0–5%) are used. When, however, larger quantities are used the opacifying efficiency of these pigments decreases until a limiting opacity is reached. Limiting opacities depend, of course, on the particular pigment being used, as well as the constitution and basis weight of the paper being made. As the limiting opacity for any pigment-furnish system is approached, additional increments in filler content become that additional filler has practically no effect on opacity. ing efficiency of the filler is reduced to such a low level that additonal filler has practically no effect on opacity. Thus, for example, the opacity of a typical envelope paper having a basis weight of 40–50 lbs./ream and containing no titanium dioxide is about 82%. If 3% titanium dioxide is added, the opacity increases to about 85%, and if 6% titanium dioxide is added, the opacity increases to about 87%. As more filler is added the opacity changes very little, making it practically impossible to attain opacities higher than 87–88% in this type of paper with titanium dioxide alone.

I have now found that the combination of multiaxial fibrous foam fragments prepared by the controlled disintegration of certain foamed resins with pigment fillers in the usual papermaking stocks enables the formation of papers possessing increased bulk and opacity which papers exhibit few of the disadvantages occasioned through the use of ordinary filling agents alone. Supplementing the effects of the filler increments, the physical aspects of the paper may be modified by adjustment of the density of the furnish to form a thicker sheet and, with less compression during drying, a bulkier product is enabled.

A further object of the present invention is to provide means whereby easily fibrillated wood fibers may be combined with a mineral loading agent and a distintegrated foamed synthetic resin and united in a strong, felted sheet possessing a high bulk and a fixed opacity.

Another object of my invention is to provide a filled paper product containing a disintegrated urea-formaldehyde foamed resin to permit maximum effectiveness of the pigmentary loading.

Other objects and advantages of the present invention will be readily apparent from the following description of certain preferred embodiment thereof.

Briefly stated, the present invention contemplates the inclusion in conventional paper stocks of pigment fillers in combination with a partially disintegrated urea-formaldehyde resin foam whereby to alter to a substantial degree the physical characteristics of the ultimate paper products derived from such stocks. The relationship of the pigments and foam to each other and the obtained advantages are represented in the drawing wherein:

The figure is a ternary diagram representing the discovered novel combination of fillers suitable for use in cellulosic material furnishes, consisting of fragmentized urea-formaldehyde foam, titanium dioxide and clay and falling in the area ABDC and E.

Lines A, F and E represent 90% opacity achieved by using the fillers of certain combinations falling on these lines. Other lines depicting relationships such as brightness, opacity, retention, etc. may be superimposed on area ABCD and E. These lines will represent the favorable results obtained as represented by the data in the examples.

Many resins have been used as paper additives. A urea-formaldehyde prepolymer, for example, formed by condensing urea and formaldehyde in an approximate 1 to 2 molar ratio may be "foamed" by its addition to a cellulated mass of a surface-active agent, water and an acid catalyst, such as sulfuric acid. Regulation of the density of the cellulated matrix by aeration thereof enables control of the density of the resin foam within limits of from 0.2 to 1.5 pounds per cubic foot. Additionally, it has been noted that the degree of aeration and matrix agitation affects the fineness and the acceptability of the ultimate foam which can have as many as $10^5$ cells per cubic centimeter. Melamine-formaldehyde resins, mixed melamine-urea-thiourea-condensation products with formaldehyde and phenol-formaldehyde resins may be similarly processed to produce lightweight foams. Other foamed resins are disclosed in U.S. Patents Nos. 2,273,367, 2,384,387 and 2,559,891 and British Patents Nos. 768,562 and 773,809.

The foamed resins, described above, are first disarranged as by dry grinding, to produce angulate fibrous resin fragments compatible in size to the pulp fibers with which they are to be blended. The extent to which the dry grinding is carried on is somewhat dependent upon the grade of paper to be made from the mixture of disintegrated foamed aminoplast and papermaking fibers. For instance in the case of a fine texturized tissue a more severe dry grinding is preferred than in the case of an industrial wiping paper where an intermediate degree of particle reduction is preferred. Preferred operative sizes fall within range of .05 mm. to 4.0 mm., but sizes both above and below these dimensions can be used, and are to be selected depending upon type of composite paper product desired.

Disintegration of the resin foam may also be effected in conventional hydropulpers, beaters, Jordans, fiberizing disc mills and the like, equipment usually employed in the preparation of wood fiber pulps. The degree of disintegration, deagglomeration or foam fracture again will depend upon the nature of the apparatus utilized and the time of exposure. Manifestly, vigorous agitation under increasing increments of pressure will result in more disintegration than would be possible when operating at low pressures for short periods of time. It is, of course, possible to effect the total deagglomeration of the resin foam with the beating of the wood pulp and the blending of the cellulosic and resin fibers preliminary to the sheet formation.

The type as well as the amount of uniaxial fibers with which the disintegrated resin foam is combined may be varied within wide limits as desired and will, of course, also having a bearing upon the nature of the ultimate paper which is formed. Cellulosic fibers from soft and hard woods, bagasse, bamboo, cotton are suitable source materials and the treatment thereof may include sulfite, sulfate, semi-chemical as well as chemi-mechanical pulping. Where a wood base is employed, groundwood pulps are quite appropriate. Although mineral fibers can replace a portion of the cellulosic fibers in the base pulp, it is preferred that these be in the minority in order to obviate the need of special bonding additives in the final sheet formation. Similarly, the presence of a small percentage of uniaxial filaments of a spun synthetic resin is also contemplated. It is preferred, however, that uniaxial cellulosic fibers constitute the major portion of the paper stock, although as much as 50% by weight of such stock may be composed of the disintegrated resin foam.

Although the pulverized dried foamed aminoplast may be added directly to the papermaking fiber in such equipment as hydropulpers, breakers, beaters, etc., we have found in the preferred embodiment of this invention it is desirable to add the dried foamed aminoplast resin component to the pulp after the major part of the beating or refining of the paper furnish essential to the mechanical or physical strength characteristics desired in the final paper has been completed. Of course, the composite mixture may thereafter be subjected to further beating, Jordaning, disc refining, etc., to insure complete homogeneity.

Furthermore, we have found that in the preliminary grinding of the foamed resin there normally exists a distribution of fragment sizes from small through intermediate to relatively large. Complete resin foam disintegration is possible only upon prolonged grinding with the result that there usually persists in the composite furnish of wood pulp and foamed aminoplast, larger fragments which remain intact or are retained as agglomerates even after the subsequent wet refining of the blend.

In the preparation of fine papers such as tissue, the preferred embodiment of this invention encompasses the removal of these larger aggregates via the process of centrifugal wet cleaning of the blend of wood pulp and foamed aminoplast, or through a special refining of the resin component, into ranges of sizes, prior to selective incorporation into the pulp fiber.

It will be apparent to those skilled in the art of papermaking, that in general the greatest effects in improving the bulk of paper will be observed where the particle sizes of the pulverized foam are large and the very low density of the foam is transferred in part to the paper. However, the limitations here are that the sizes should be of the same order of magnitude as those of the papermaking fibers in order that a homogeneous blend may result; otherwise, coarseness and grittiness of the surface prevails.

On the other hand, the greatest opacity improvements will be observed when the particle sizes are reduced to very small dimensions.

The invention will be more particularly described with reference to the following examples which are intended for purposes of illustration only. Constituents are given in parts by weight.

EXAMPLE 1

Bleached southern pine kraft pulp and bleached southern hardwood kraft pulp were beaten separately to a Canadian-Standard Freeness of 350–400 cc. in a 5 lb. Valley Cycle Beater. Then 70 parts of the pine and 30 parts of the hardwood pulp were blended at 0.5–0.6% consistency in a 200 gallon stock chest and 7 parts filler clay (AL–SIL–ATE–W, a calcined clay with 80% of its particles measuring less than 5 microns in size manufactured by the Charles A. Wagner Co., Inc.) and 1½ parts rosin size (Pexol, by Rohm & Haas Co.) and 3 parts alum were blended into the stock which acquired a pH of approximately 4.0–4.5.

Based on bone dry weight of pulp the constituents are 7% clay; 1.5% rosin size; 3% alum.

The above stock was run onto a 10 inch cylinder machine and the basis weight of the sheet adjusted to 45 lbs. per ream. Machine conditions were as follows:

| | |
|---|---|
| Machine speed | f.p.m. 10 |
| Pressure roll load | p.l.i. 150 |
| Dryer temperature | °C. 50 |
| Moisture | percent 5 |

Paper prepared in this manner retained 71% of the clay pigment present in the stock and had the following properties:

| | |
|---|---|
| Opacity | percent 81.7 |
| Brightness | do 81.7 |
| Basis weight | lbs./ream 44.2 |
| Caliper | mils 4.4 |
| Specific volume | cc./g 1.49 |
| Breaking length | meters 5170 |
| Tear factor | 115 |

The results on the triangular graph in the drawing are represented as follows: clay 100%; $TiO_2$ 0%; and foam 0%.

EXAMPLE 2

Paper was prepared as in Example 1 using in addition to 7 parts filler clay, 3 parts titanium dioxide having a particle size of about 0.5 microns. Based on B.D. (bone dry) weight of pulp the constituents are: 7% clay; 3% $TiO_2$; 0% foam; 1.5% rosin size; and 3.0% alum. This paper retained 71% of the total filler (clay plus TiO$_2$) added, and had the following properties:

| | | |
|---|---|---|
| Opacity | percent | 84.1 |
| Brightness | do | 84.2 |
| Basis weight | lbs./ream | 40.0 |
| Caliper | mils | 4.0 |
| Specific volume | cc./g | 1.48 |
| Breaking length | meters | 5560 |
| Tear factor | | 120 |

The results on the triangular graph in the drawing are represented as follows: clay 70%; TiO$_2$ 30% and foam 0%.

EXAMPLE 3

Paper was prepared as in Example 1 using in addition to 7 parts filler clay, 6 parts titanium dioxide. Based on B.D. weight of pulp the constituents are 7% clay; 6% TiO$_2$; 0% foam; 1.5% rosin size; and 3.0% alum. This paper retained 75% of the total filler (clay plus TiO$_2$) added, and had the following properties:

| | | |
|---|---|---|
| Opacity | percent | 86.9 |
| Brightness | do | 84.3 |
| Basis weight | lbs./ream | 41.5 |
| Caliper | mils | 4.1 |
| Specific volume | cc./g | 1.49 |
| Breaking length | meters | 4760 |
| Tear factor | | 100 |

The results on the triangular graph in the drawing are represented as follows: clay 54%; foam 0% and TiO$_2$ 46%.

EXAMPLE 4

A mixture of 240 parts of urea, 723.4 parts of a 36% formaldehyde solution inhibited with 5.2% methyl alcohol (i.e., 260 parts formaldehyde, 425.4 parts water, and 38.0 parts methyl alcohol) and 2 parts 4 M sodium hydroxide was placed in a 150 gallon stainless steel reaction vessel equipped with a reflux condenser, steam jacket for heating, thermometer and mechanical agitator. After these ingredients were thoroughly mixed, 41.2 parts of 24% ammonium hydroxide were added, the resulting mixture heated to reflux temperature (about 97–99° C.), and reflux continued for 15 minutes. Then 2.0 parts of 4 M phosphoric acid were added and reflux continued for about 2 hours after which time a test sample, cooled to 20° C. had a viscosity of 45 centistokes and a gel time of 85 seconds. The reaction was then stopped by adjusting the pH of the solution to 7.5 with the addition of approximately 9 parts 10% sodium hydroxide. The resulting resin sirup contained about 42% non-volatile solids.

To 1000 parts of the above resin were added 20 parts urea, 100 parts of 34% Teepol 610 (sodium secondary alkyl sulfate manufactured by the Shell Chemical Co.), and 880 parts of water. The resulting resin solution contained 21% non-volatile solids and was converted into a partially hardened foam by continuous aeration with compressed air and subsequent injection of 0.65 M phosphoric acid catalyst. During foaming the following conditions were used:

| | | |
|---|---|---|
| Resin flow (21% solution) | cc./min | 800 |
| Catalyst flow (0.65 M HPO$_4$) | cc./min | 400 |
| Air flow (at STP) | cc./min | 45,000 |
| Foam chamber pressure | p.s.i.g | 60 |
| Temperature | ° C | 28 |

Foam was collected in 30″ x 18″ x 8″ wire mesh containers which were placed in a circulating air curing cabinet having inside dimensions of 3½′ x 4′ x 13′. Air was circulated at a rate of 1000 c.f.m. while temperature and relative humidity were maintained at 85° C. and 40% respectively. The containers of foam were removed from the oven after 3 hours of curing. The cured foam had a density of 0.30 lb. per cubic foot on a dry basis. Any brittle crust which had formed on the foam blocks during curing was removed with a knife.

Blocks of cured and skinned foam were disintegrated into fibrous multiaxial foam fragments at 0.8% consistency in a 400 gallon Morden Slush-Maker. The disintegrated foam was dewatered in screen boxes and transferred to a 150 gallon kettle equipped with a vacuum pump and mechanical agitator. Batches of foam fragments were thoroughly deaired at 1.0% consistency by evacuating the kettle until a negative pressure of about 27″ mercury was attained, agitating the slurry vigorously, and then rapidly increasing the pressure to atmospheric pressure. This process was repeated 2 or 3 times or until the slurry of foam fragments exhibited absolutely no tendency to float on the surface of the water. The slurry was then removed from the kettle and taken to the paper machine.

Bleached kraft southern pine pulp and bleached kraft southern hardwood pulp were beaten separately to a Canadian Standard Freeness of 300–350 cc. in a 5 lb. Valley Cycle Beater. Then 70 parts of the pine and 25 parts of the hardwood pulp were blended at 0.5% consistency in a 200 gallon stock chest and 7 parts filler clay (AL–SIL–ATE–W), 3 parts titanium dioxide, and 5 parts deaired, fibrous, multiaxial foam fragments were added. Next, 1½ parts rosin size (Pexol) and 3 parts alum were blended into the stock which acquired a pH of 4.0–4.5. Based on B.D. weight of pulp the constituents are 7.37% clay; 3.16% TiO$_2$; 5.27% foam; 1.58% rosin size; and 3.10% alum.

Paper was made from this stock as in Example 1. This paper retained 76% of the total filler (clay plus TiO$_2$) added, and had the following properties:

| | | |
|---|---|---|
| Opacity | percent | 86.9 |
| Brightness | do | 85.5 |
| Basis weight | lbs./ream | 42.8 |
| Caliper | mils | 4.7 |
| Specific volume | cc./g | 1.64 |
| Breaking length | meters | 5360 |
| Tear factor | | 80 |

The results on the ternary graph in the drawing are represented as follows: clay 47%; TiO$_2$ 20%; foam 33%.

EXAMPLE 5

Paper was prepared as in Example 4 using 70 parts pine pulp and 20 parts hardwood pulp, plus 3 parts titanium dioxide, 10 parts foam fragments, and 7 parts filler clay. Based on B.D. pulp the constituents are: 7.77% clay; 3.34% TiO$_2$; 11.11% foam; 1.67% rosin size; 3.34% alum. This paper retained 79% of the total filler (clay plus TiO$_2$) added, and had the following properties:

| | | |
|---|---|---|
| Opacity | percent | 90.0 |
| Brightness | do | 86.0 |
| Basis weight | lbs./ream | 43.5 |
| Caliper | mils | 5.0 |
| Specific volume | cc./g | 1.71 |
| Tear factor | | 100 |
| Breaking length | meters | 4310 |

The results on the ternary graph are represented as follows: 35% clay; 15% TiO$_2$; 50% foam.

EXAMPLE 6

A mixture of 70 parts bleached southern pine kraft pulp and 30 parts bleached southern hardwood kraft pulp was beaten to a Canadian freeness of 480 cc. on a Jones Midget Jordan and transferred to the stock chest of a 20″ fourdrinier paper machine. To this chest were added 6 parts of filler clay (AL–SIL–ATE–W), 3 parts titanium dioxide, and 1½ parts rosin size (Pexol). The consistency of the stock was then adjusted to 1.0–1.5% and 3 parts of alum added to adjust the pH of 4.0–4.5. The stock was permitted to mix several minutes.

The above stock was run onto a 20″ fourdrinier paper machine having an open headbox, and the sheet weight adjusted to 45 lbs. per ream. Machine conditions were as follows:

Machine speed _____ f.p.m__ 30
Press load _____ p.l.i__ 10
Moisture _____ percent__ 5

Paper prepared in this manner retained 63% of the total filler (clay plus TiO₂) added.

The paper was surface sized with starch prepared as follows: "Stayco A," a low viscosity starch manufactured by the Staley Starch Company, was dissolved in hot water to yield a 4% solution which was cooked at just below the boiling temperature for one hour and then cooled to 140–155° F. prior to use. The starch was applied to the paper with a 12 inch size press using a rubber/steel nip loaded to 65 p.l.i. The speed of the press was adjusted so that the paper absorbed about 20% of its weight as starch solution. Sized paper was dried under tension with radiant lamps prior to rewinding and calendering.

Single 9 inch x 12 inch sheets of sized paper were calendered on a 12 inch calender using a steel/steel nip loaded to 100 p.l.i. Each sheet was passed through the nip twice.

Paper prepared and treated in the above manner was suitable for use as envelope paper, printing paper and the like. It had the following properties:

Opacity _____ percent__ 87.8
Brightness _____ do____ 86.3
Basis weight _____ lbs./ream__ 48.0
Caliper _____ mils__ 4.9
Specific volume _____ cc./g__ 1.38
Breaking length _____ meters__ 4610
Tear factor _____ 140

EXAMPLE 7

A mixture of 240 parts of urea, 723.4 parts of a 36% formaldehyde solution inhibited with 10.5% methyl alcohol (i.e., 260 parts formaldehyde, 387.2 parts water, and 76.2 parts methyl alcohol), and 2 parts 4 M sodium hydroxide was placed in a 150 gallon stainless steel reaction vessel equipped with a reflux condenser, steam jacket for heating, mechanical thermometer and mechanical agitator. After these ingredients were thoroughly mixed, 41.2 parts of 24% ammonium hydroxide were added, the resulting mixture heated to reflux temperature (about 90–92° C.), and reflux continued for 15 minutes. Then 2.5 parts of 4 M phosphoric acid were added and reflux continued for about 1 hour, after which time a test sample, cooled to 20° C. had a viscosity of 46 centistokes and a gel time of 138 seconds. The reaction was then stopped by adjusting the pH of the solution to 7.5 with the addition of approximately 12 parts of 10% sodium hydroxide. The resulting resin sirup contained about 42% nonvolatile solids.

This resin was diluted, foamed and cured as in Example 4. The cured foam had a density of 0.28 lb. per cubic foot on a dry basis.

Blocks of cured but unskinned foam were disintegrated in a Morden Slush-Maker at a consistency of 0.8%. After being diluted further to about 0.5% consistency, the resulting slurry of angulate, fibrous fragments of U–F foam was drawn continuously into the top of a vacuum tank in which a negative pressure of about 26″ mercury and constant, vigorous agitation were maintained. As the dilute slurry passed into the vacuum tank, entrained and dissolved gases were forced from the slurry and removed by the vacuum pump. The slurry fell by gravity to the bottom of the tank from which it was removed by a positive displacement (Moyno) pump at the same rate (about 10 g.p.m.) as the slurry was being drawn into the tank.

Foam fragments deaired in this fashion exhibited absolutely no tendency to float.

The deaired, 0.5% slurry of fibrous, multiaxial foam fragments was screened and cleaned with a 3 inch Bauer centricleaner equipped with a 7⁄32 inch reject tip and operated at a pressure differential of 40 p.s.i.g. The purpose of this step was to remove any crust material which had been present on the foam blocks. After centricleaning the slurry was deaired as described above and transferred to the paper machine.

A mixture of bleached pulps was prepared as in Example 6 except that the titanium dioxide was omitted and 10 parts of deaired, fibrous, multiaxial foam fragments were added to the stock. Paper was made from this stock as in Example 6 and was found to retain 89% of the total filler (clay) added.

The paper was sized and calendered as in Example 6 and found to have the following properties:

Opacity _____ percent__ 89.3
Brightness _____ do____ 87.3
Basis weight _____ lbs./ream__ 43.5
Caliper _____ mils__ 5.1
Specific volume _____ cc./g__ 1.52
Breaking length _____ meters__ 3650
Tear factor _____ 110

EXAMPLE 8

Paper was prepared as in Example 7 except that 3 parts titanium dioxide and 7 parts of the deaired, fibrous multiaxial foam fragments were used in the stock. This paper retained 75% of the total filler (clay plus TiO₂) added, and had the following properties:

Opacity _____ percent__ 91.4
Brightness _____ do____ 88.8
Basis weight _____ lbs./ream__ 48.2
Caliper _____ mils__ 5.0
Specific volume _____ cc./g__ 1.47
Breaking length _____ meters__ 3840
Tear factor _____ 130

EXAMPLE 9

A foamed resin was produced in accordance with the disclosures of British Patents Nos. 768,562 and 773,809. The density of the resultant foam was 0.56 pound per cubic foot, although its texture and physical appearance were in other respects substantially identical to that of the foam in Example 7.

This material was dry ground in an Abbe mill with the screen plate removed. The product was pulverized and shredded by the milling but not finely powdered, and 13 parts thereof were combined with 3 parts of titanium dioxide in making a paper in accordance with the technique of Example 7.

This paper retained 96% of the total filler (clay plus TiO₂) added, and had the following properties:

Opacity _____ percent__ 93.0
Brightness _____ do____ 90.4
Basis weight _____ lbs./ream__ 46.6
Caliper _____ mils__ 5.2
Specific volume _____ cc./g__ 1.57
Breaking length _____ meters__ 3150
Tear factor _____ 100

Printability with low viscosity ink was excellent.

EXAMPLE 10

Paper was prepared as in Example 4 using 70 parts pine pulp and 20 parts hardwood pulp, plus 0 part titanium dioxide, 10 parts foam fragments, and 7 parts filler clay. Based on B.D. pulp the constituents are 7.77% clay; 0.0% TiO₂; 11.1% foam; 1.67% rosin size; and 3.33% alum.

This paper retained 78% of the total filler (clay) added, and had the following properties:

| | | |
|---|---|---|
| Opacity | percent | 87.0 |
| Brightness | do | 84.4 |
| Basis weight | lbs./ream | 41.3 |
| Caliper | mils | 5.2 |
| Specific volume | cc./g | 1.89 |
| Breaking length | meters | 3270 |
| Tear factor | | 100 |

The results on the ternary graph are represented as follows: 41% clay; 59% foam; 0% $TiO_2$.

Data from the foregoing examples are summarized in Table 1 from which it is readily apparent that the addition of fibrous, multiaxial fragments of cured aminoplast foam to paper greatly improved both the retention of pigments by the paper and the opacity of the paper. It should be particularly noted that combinations of titanium dioxide and foam fragments produced papers which had higher opacities than papers made with equal amounts of either component alone.

TABLE I

| Example | $TiO_2$ Parts | Foam Parts | Filler Retention, Percent | Opacity, Percent |
|---|---|---|---|---|
| 1 (10″ cylinder) | 0 | 0 | 71 | 81.7 |
| 2 (10″ cylinder) | 3 | 0 | 71 | 84.1 |
| 3 (10″ cylinder) | 6 | 0 | 75 | 86.9 |
| 4 (10″ cylinder) | 3 | 5 | 76 | 86.9 |
| 5 (10″ cylinder) | 3 | 10 | 79 | 90.0 |
| 6 (20″ fourdrinier) | 3 | 0 | 63 | 87.8 |
| 7 (20″ fourdrinier) | 0 | 10 | 89 | 89.3 |
| 8 (20″ fourdrinier) | 3 | 7 | 75 | 91.4 |
| 9 (20″ fourdrinier) | 3 | 13 | 96 | 93.0 |
| 10 (10″ cylinder) | 0 | 10 | 78 | 87.0 |

EXAMPLE 11

A suitable furnish for preparing sheeted materials consists of: 70.0 parts pine pulp; 7.0 parts hardwood pulp; 23.0 parts foam; 7.0 parts clay; 2.0 $TiO_2$; 1.5 parts rosin size; and 3.0 parts alum.

Based on B.D. pulp the constituents are: 9.1% clay; 2.6% $TiO_2$; 30.0% foam; 1.95% rosin size; and 3.9% alum. The results on the ternary graph are represented as follows: 22.0% clay; 7% $TiO_2$; 71% foam. Opacity of the sheeted material is about 90%.

EXAMPLE 12

A suitable furnish for preparing sheeted materials consists of: 70.0 parts pine pulp; 20.7 parts hardwood pulp; 9.3 parts foam; 7.0 parts clay; 12.8 parts $TiO_2$; 1.5 parts rosin size and 3.0 parts alum.

Based on B.D. pulp the constituents are: 7.72% clay; 14.1% $TiO_2$; 10.2% foam; 1.65% rosin size; and 3.31% alum. The results on the ternary graph are represented as follows: 24% clay; 44% $TiO_2$; and 32% foam. Opacity of the sheeted material is about 90%.

EXAMPLE 13

A suitable furnish for preparing sheeted materials consists of: 70.0 parts pine pulp; 21.5 parts hardwood pulp; 8.5 parts foam; 7.0 parts clay; 34.5 parts $TiO_2$; 1.5 parts rosin size; and 3.0 parts alum.

Based on B.D. pulp the constituents are: 7.6% clay; 37.7% $TiO_2$; 9.3% foam; 1.64% rosin size; and 3.28% alum. The results on the ternary graph are represented as follows: 14% clay; 69% $TiO_2$; and 17% foam. Opacity of the sheeted material is about 90%.

EXAMPLE 14

A suitable furnish for preparing sheeted materials consists of: 70.0 parts pine pulp; 22.6 parts hardwood pulp; 7.4 parts foam; 7.0 parts clay; 1.6 parts $TiO_2$; 1.5 parts rosin size; and 3.0 parts alum.

Based on B.D. pulp the constituents are: 7.56% clay; 1.73% $TiO_2$; 8.0% foam; 1.62% rosin size; and 3.24% alum. The results on the ternary graph are represented as follows: 44.0% clay; 10.0% $TiO_2$; 46.0 foam. Opacity of the sheeted material is about 87.0%.

EXAMPLE 15

A suitable furnish for preparing sheeted materials consists of: 70.0 parts pine pulp; 29.2 parts hardwood pulp; .8 part foam; 7.0 parts clay; 6.2 parts $TiO_2$; 1.5 parts rosin size; and 3.0 parts alum.

Based on B.D. pulp the constituents are 7.06% clay; 6.25% $TiO_2$; .81% foam; 1.51% rosin size; and 3.15% alum. The results on the ternary graph are represented as follows: 50% clay; 44% $TiO_2$; 6% foam. The properties of the sheeted material are:

| | | |
|---|---|---|
| Opacity | percent | 87 |
| Brightness | do | 84.8 |
| Basis weight | lbs./ream | 42.0 |
| Caliper | mils | 4.3 |
| Specific volume | cc./g | 1.58 |
| Breaking length | meters | 5130 |
| Tear factor | | 90 |

From the foregoing it is quite clear that the combined resin foam and mineral pigment inclusions in the various paper furnishes increase sheet opacity considerably in excess of that obtainable by either component separately and at the same time contribute to improvement of other properties which are of particular value to such products. Immeasurable physical properties, ascertainable only upon inspection, of the paper of our invention are increased softness, enhanced surface attractiveness and feel.

The opaque papers of my invention are acceptable substitutes for the more conventional papers of modern commerce and the development of a novel filling media, that is, disintegrated foams and more especially disintegrated aminoplast resin foams in combination with mineral pigments enable the generation within the ultimate paper products of properties which impart to such products considerable commercial potential.

It is realized that in all practical grinding operations involving the foamed resins to which my invention pertains, a distribution of particle sizes of varying shapes and contours inevitably results. In the making of a foamed resin product, the froth matrix consists of many small bubbles which, upon expansion, are converted from spheres to contiguous dodecahedrons constituting cells having, ideally, twelve pentagonal membraneous faces. During resin condensation and post-cure, a majority of these faces are removed, the substance thereof moving into the marginal strands, resulting in reticulation of the cellular structure and formation of a skeletal configuration consisting of these marginal strands, the residues of intersecting cell faces, joined anisotropically at spaced nexae.

Upon disintegration, these reticulated three-dimensional strands are broken irregularly to create various spacial geometric forms, all of which may be considered as substantially angulate fibrous fragments of the original mass. Classification or screening enables separation of the foam fragments into different grades capable of supplying varying degrees of "bulking factor" to paper products in which they are embodied. It is preferred that the average overall dimension of the foam fragments be from 0.1 to 1½ times that of the average length of the paper-making fiber with which they are to be blended.

In the case of conifers such as pine, spruce and hemlock the fiber length may be as high as 4 mm., while in the case of hardwoods such as gum, oak and poplar the fiber length may be as low as 1 mm. It resolves, therefore, in the preferred embodiment of this invention that the average overall dimensions of the particles of the pulverized foamed resin should lie in the approximate range of from 0.1 to 6 mm.

It will be understood that the paper products of the present invention may be modified by the inclusion therein of other paper-forming fibrous materials, sizes, impregnating agents, coating materials, fillers, wet strength resins commonly encountered in paper manufacture. Additionally, manifold variations in compositions and procedural details of their formaiton are possible without departing from the spirit of the invention or the scope of the appended claim.

What is claimed is:

An improved combination of fillers comprised of angulate fibrous fragments of foamed aminoplast resins, clay and titanium dioxide, said combination being suitable for inclusion as fillers in a furnish of cellulosic fibrous materials, the proportion of each filler in said combination represented by the area ABCD and E in the figure.

References Cited

UNITED STATES PATENTS

| | | | |
|---|---|---|---|
| 2,943,971 | 7/1960 | Taylor | 162—181 |
| 3,004,884 | 10/1961 | Ebert et al. | 260—2.5 |
| 3,037,903 | 6/1962 | Baumann et al. | 260—2.5 |
| 3,038,867 | 6/1962 | Czepiel | 260—2.5 |
| 3,047,538 | 7/1962 | Steinmann | 260—2.5 |
| 3,117,098 | 1/1964 | Ebert et al. | 260—2.5 |

OTHER REFERENCES

Casey, "Pulp and Paper," vol. 1, Interscience Publishers Inc., New York, 1952, pp. 469, 470.

MURRAY TILLMAN, *Primary Examiner.*

M. FOELAK, *Assistant Examiner.*